(12) United States Patent
Boudreaux

(10) Patent No.: US 7,246,031 B2
(45) Date of Patent: Jul. 17, 2007

(54) PIPELINE LOCATOR/COORDINATE MAPPING DEVICE

(76) Inventor: Todd Gerard Boudreaux, 178 River Rd., Lafayette, LA (US) 70501

( * ) Notice: Subject to any disclaimer, the term of this patent is extended or adjusted under 35 U.S.C. 154(b) by 0 days.

(21) Appl. No.: 11/486,860

(22) Filed: Jul. 17, 2006

(65) Prior Publication Data

US 2006/0254373 A1    Nov. 16, 2006

Related U.S. Application Data

(62) Division of application No. 10/843,043, filed on May 11, 2004, now Pat. No. 7,100,463.

(60) Provisional application No. 60/510,726, filed on Oct. 10, 2003.

(51) Int. Cl.
*F16L 55/48* (2006.01)
*G01M 19/00* (2006.01)

(52) U.S. Cl. .................................. 702/152; 73/865.8

(58) Field of Classification Search .... 73/865.8–865.9, 73/866.5, 489; 702/150, 152
See application file for complete search history.

(56) References Cited

U.S. PATENT DOCUMENTS

| | | | |
|---|---|---|---|
| 3,753,296 A | 8/1973 | Van Steenwyk | |
| 4,611,405 A | 9/1986 | Van Steenwyk | |
| 4,768,152 A | 8/1988 | Egli et al. | |
| 4,799,391 A | 1/1989 | Lara | |
| 4,945,775 A | 8/1990 | Adams et al. | |
| 4,987,684 A | 1/1991 | Andreas et al. | |
| 5,331,578 A | 7/1994 | Stieler | |
| 5,640,780 A | 6/1997 | Kermabon | |
| 5,657,547 A | 8/1997 | Uttecht et al. | |
| 5,659,142 A | 8/1997 | Lima et al. | |
| 5,821,414 A | 10/1998 | Noy et al. | |
| 5,992,246 A | 11/1999 | Nice | |
| 6,108,921 A | 8/2000 | Goedecke | |
| 6,170,344 B1 | 1/2001 | Ignagni | |
| 6,243,657 B1 | 6/2001 | Tuck et al. | |
| 6,453,239 B1 | 9/2002 | Shirasaka et al. | |
| 6,539,778 B2 | 4/2003 | Tucker et al. | |
| 6,553,322 B1 | 4/2003 | Ignagni | |
| 6,931,952 B2 | 8/2005 | Rantala et al. | |
| 7,107,863 B2 * | 9/2006 | Harthorn et al. | ............ 73/865.8 |
| 7,120,564 B2 * | 10/2006 | Pacey | ................... 702/150 X |
| 7,131,344 B2 * | 11/2006 | Tarumi | ..................... 73/865.8 |
| 7,137,308 B2 * | 11/2006 | Harris | ........................ 73/865.8 |
| 7,164,476 B2 * | 1/2007 | Shima et al. | .......... 73/865.8 X |
| 7,181,985 B2 * | 2/2007 | MacMillan et al. | ........ 73/865.8 |
| 2003/0089267 A1 | 5/2003 | Ghorbel et al. | |
| 2003/0164053 A1 | 9/2003 | Ignagni | |
| 2004/0261547 A1 | 12/2004 | Russell et al. | |

* cited by examiner

*Primary Examiner*—Thomas P. Noland
(74) *Attorney, Agent, or Firm*—Perret Doise, APLC

(57) ABSTRACT

The pipeline locator/coordinate mapping device is a tool to be utilized for the location of pipeline coordinate data points via a Cartesian coordinate system. The device will initiate from a known origin or datum with horizontal, X coordinate; longitudinal, Y coordinate; and vertical, Z coordinate respectively being equal to zero. As the device traverses internally through the pipeline, away from the origin or datum, a time increment will correspond to the recorded data, pressures and accelerations, and hence allow the positional coordinate points along the pipeline to be derived in three dimensional space for incremental positions versus time. By analysis of the data displacements from the origin or datum in succession, the pipeline may be located and mapped in an as-built position from a frame of reference, i.e. longitudinal and latitudinal coordinates along the earth.

3 Claims, 5 Drawing Sheets

PIPELINE LOCATOR/COORDINATE MAPPING DEVICE

CROSS-REFERENCE TO RELATED APPLICATIONS

This application is a division claiming the benefit under 35 U.S.C. 120 of U.S. patent application Ser. No. 10/843,043, filed May 11, 2004, and now U.S. Pat. No. 7,100,463, which claimed the benefit of U.S. provisional application No. 60/510,726, filed Oct. 10, 2003, which benefit is also claimed herefor.

FIELD OF THE INVENTION

This invention relates to the locating and mapping of pipelines via an internal tool traversing through the pipeline.

BACKGROUND OF THE INVENTION

Various devices have been used to traverse a pipeline internally for different applications. Internal devices for cleaning, measuring the ovality and measuring the integrity of the pipe material itself are currently available.

SUMMARY OF THE INVENTION

This device will traverse internally through a pipeline for the purpose of recording positional data along the length of the pipeline. By recording the data corresponding to a specific increment of time, the device, while being propelled by external means to the device along the pipeline, will record data that may be derived into positional coordinates in three dimensional space with respect to a frame of reference.

The device will utilize pressure and acceleration sensor components in recording the data. When coupled with the time component for a particular data point, the velocity and acceleration may be ascertained and hence the positional coordinate point of the pipeline location will be derived as displaced from an origin. The pressure sensor will be utilized for velocity calculation via a venturi type nozzle. The acceleration sensor, independent of the pressure sensor, will be utilized for acceleration data recording via an accelerometer for each principal direction.

Based on the acceleration data obtained, the time increment may be utilized for computation of displacements from previous positional coordinate points. When pressure sensor data of record is combined with the time increment, the device will have a redundant velocity record in the longitudinal direction for increased confidence in longitudinal positioning of the pipeline. The acceleration sensor data of record when combined with the time increment will produce acceleration data applicable to derivation of positional displacements in the principal directions of horizontal, X; longitudinal, Y; and vertical, Z, respectively of each pipeline coordinate point.

These sensory data, as recorded, will be stored in a memory type computer chip for data acquisition by a computer program external to the device and hence upon completion of a run through a pipeline for location determination. Upon ascertaining the data of pressure and acceleration coupled with a specific time increment, mathematical analysis can be utilized for deriving each positional coordinate in three dimensional space with respect to a displacement from a frame of reference, i.e. longitudinal and latitudinal coordinates along the Earth.

When these positional coordinates are drawn to a scale beginning from the origin or datum, the pipeline itself may be located and mapped in three dimensional space with respect to the origin or datum and an as-built plan of the pipeline may be created for various utilizations and documentations.

Accordingly, the primary objectives of the pipeline locator/coordinate mapping device is to measure, record and produce a compilation of data which can be manipulated into an accurate pipeline as-built positional plan. The use of this device will forgo the current manual type external pipeline location devices such as gradiometers and magnetometers and internal automatic integrity type smart pig devices with a significant economy of utilization for as-built pipeline position documenting.

The following lists the figures of the attached drawings and description thereof:

DETAILED DESCRIPTION OF PREFERRED EMBODIMENTS

Figure 1:
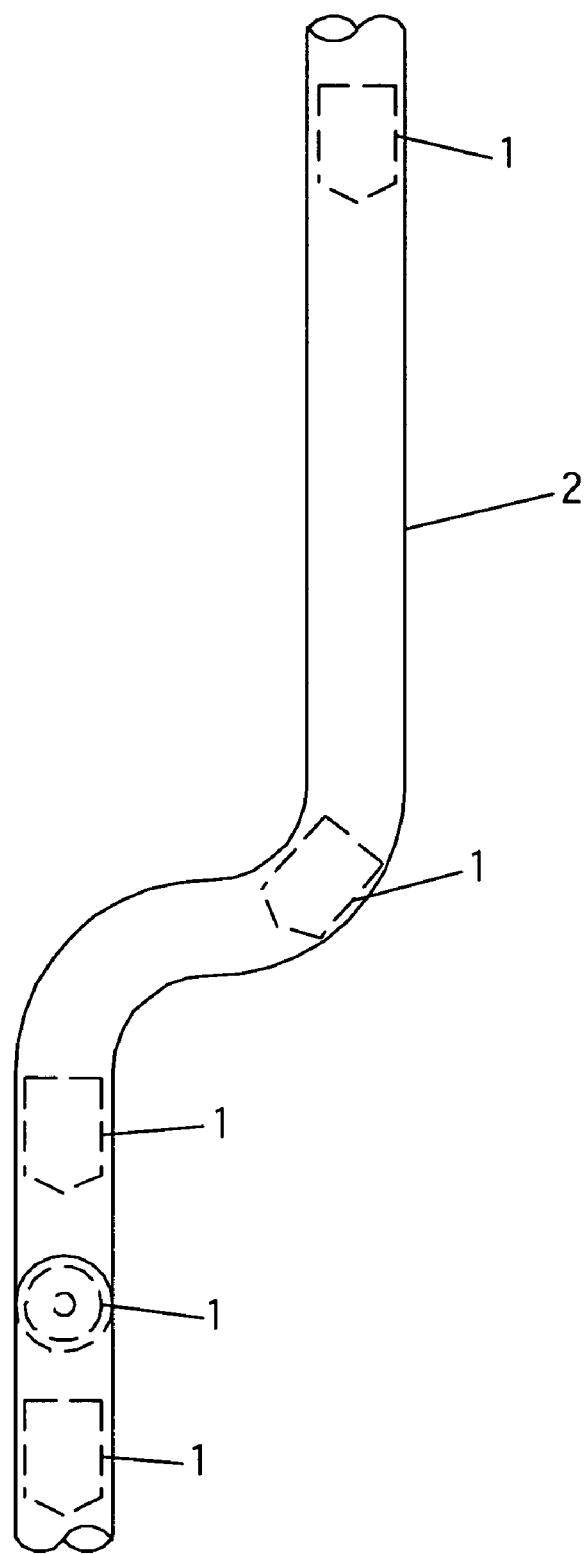
FIG. 1 illustrates the general arrangement of the device within a pipeline.

Various materials may be suitable for the device, machined aluminum is recommended at this time for all components except control, sensor, power and circuitry. Also, it is recommended that the device be encapsulated in a protective coating for reduced flow restriction and damage prevention thereof. A tear drop or cone shaped molded polypropylene or polyurethane coating would be advisable with openings allotted for the cylindrical nozzles as illustrated in the drawings. Control instrumentation, sensors, power supply and circuitry should be customized standard components and materials which are readily available.

With particular reference to the drawings, FIG. 1 illustrates a method for utilization of the device. The pipeline to be located 1 has the device 2 being traversed internally through its length of straight and curved sections. The means of locomotion should be external to the device but internal to the pipeline, i.e. a pressurized fluid stream. As shown with respect to pipeline curvature, the pipeline may be located within three dimensional coordinate data points with respect to an allotted Cartesian coordinate system of reference.

Figure 2:
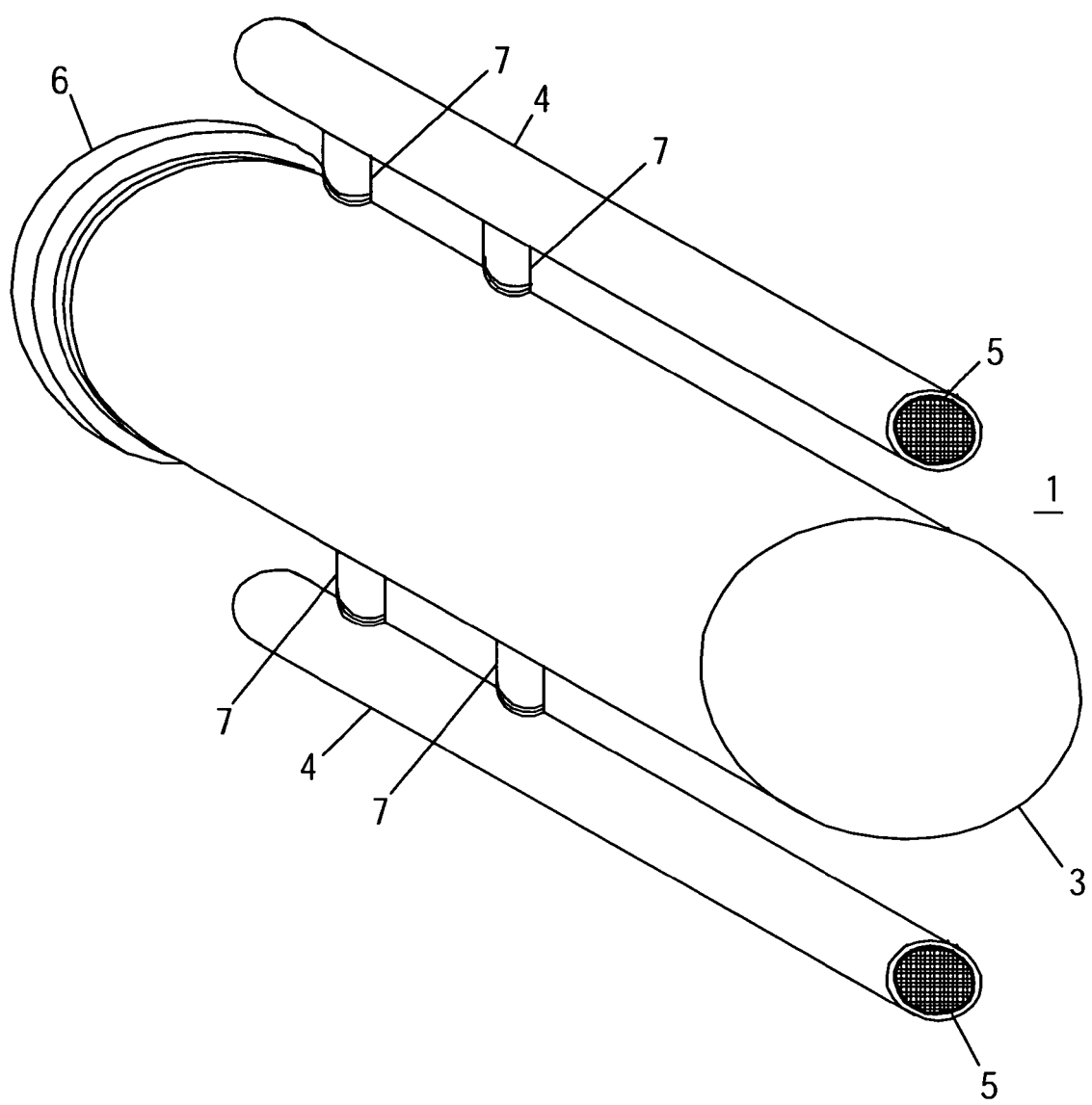
FIG. 2 is an isometric view of the proposed device.

Referring to FIG. 2, the device is a cylindrically contained outer shell 3 with threaded end cap attachment 6. The cylindrical nozzles 4, upper and lower, have screen mesh 5 on the entrance end for deterrence of possible particle entrainment or obstruction. The nozzles 4 are connected to the outer shell 3 via threaded nipples 7.

Figure 3:
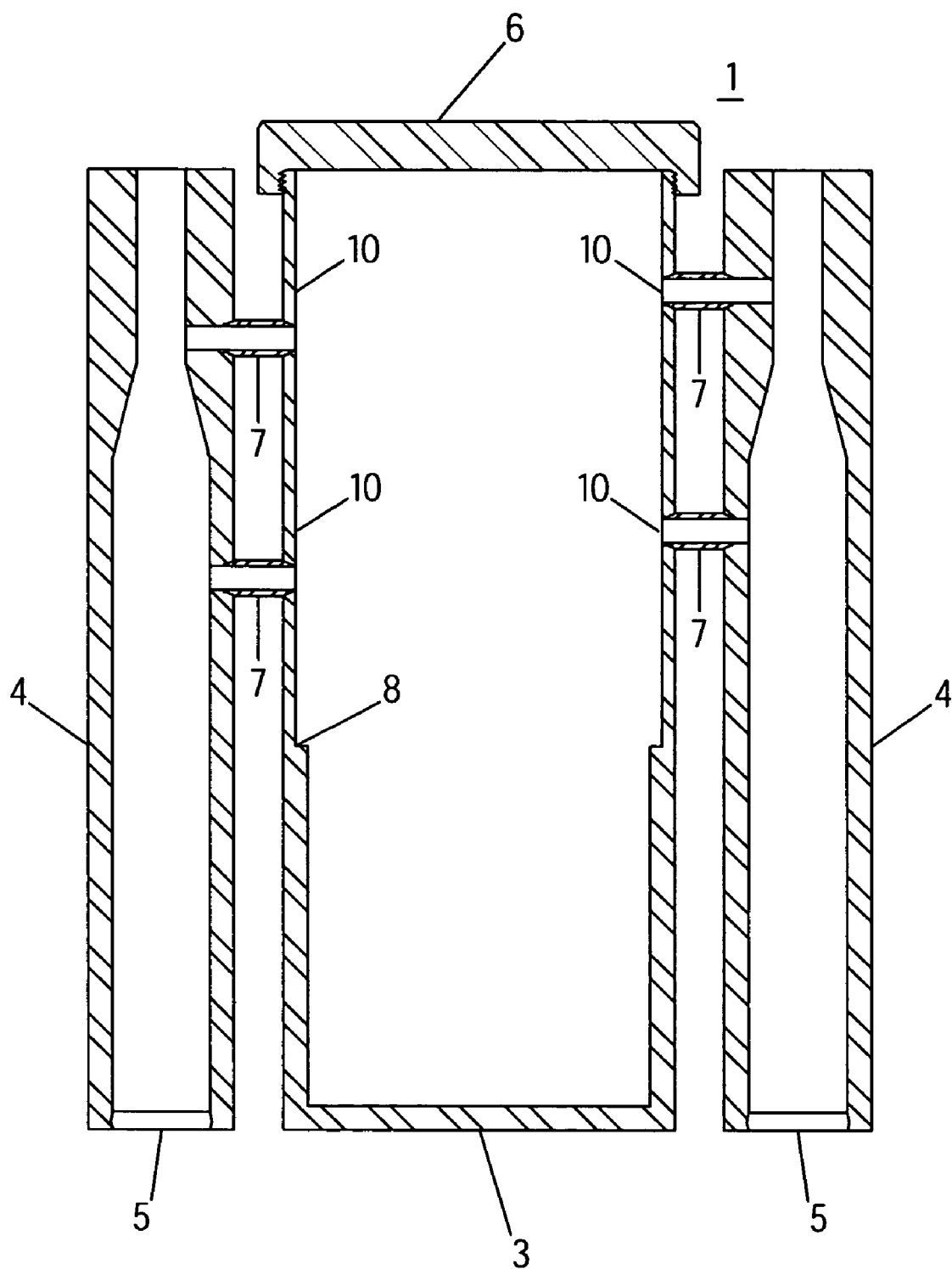
FIG. 3 is a cross-sectional view of the outer shell of the device.

FIG. 3 further illustrates the outer shell 3 and nozzles 4 with a cross-sectional view vertically through the center of the device. The direction of traverse of the pipeline would be forward towards the screen mesh 5 nozzle entrance. Differential pressure measurement may be measured through sensors located at orifice holes 10 through taps in the nozzles 4 and outer shell 3 within the threaded nipples 7. From direct measurement of the change in, or differential, pressure within the nozzles, the velocity of the device traversing the pipeline may be derived mathematically. The outer shell 3 is contained with a threaded end cap attachment 6 for possible leak intrusion. A machined shoulder 8 within the outer shell cylinder will be utilized for a roller bearing seat 9 for horizontal positioning of the inner shell 12 and hence control instrumentation board 13, as shown in FIG. 4.

Figure 4:
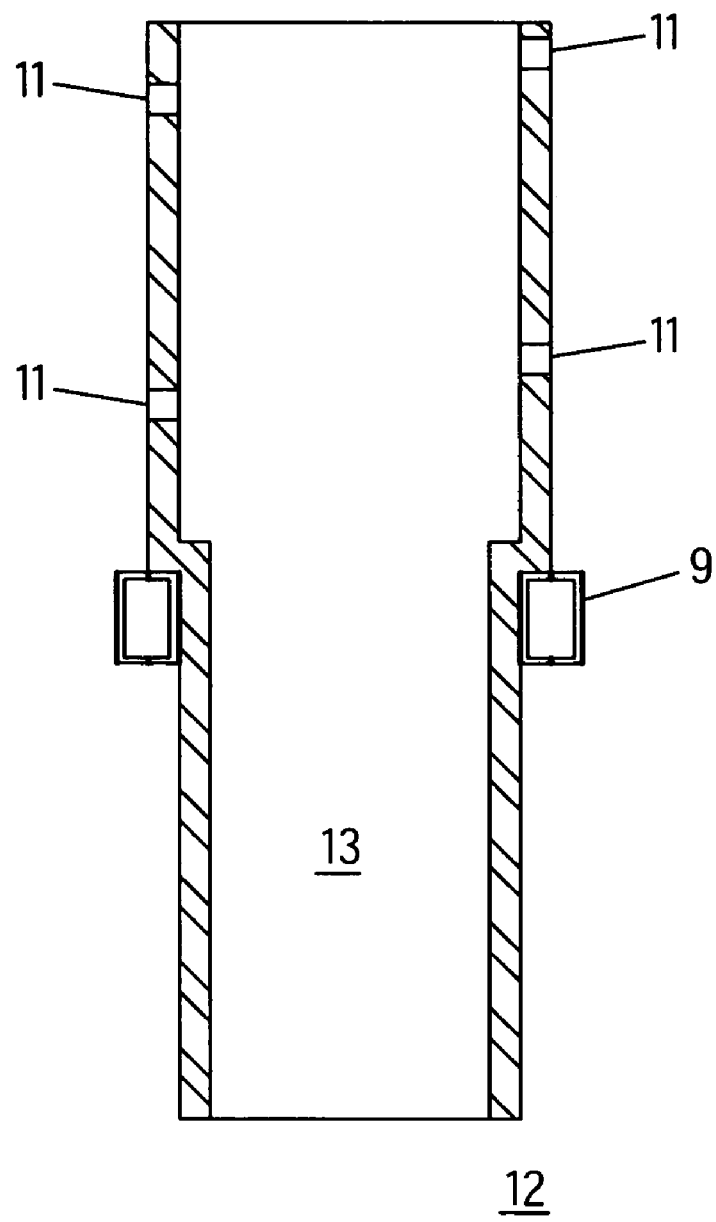
FIG. 4 is a cross-section view of the inner shell of the device.

Referring to FIG. 4, the inner shell 12 is an open ended cylinder machined with a shoulder external to the shell for a roller bearing seat 9. The inner shell 12 will have machined thru holes 11 for pressure sensor electronic loop contacts due to possible rotation of device during pipeline traverse. The control instrumentation board with sensor components 13 will be inserted within inner shell 12, as shown during device utilization of pipeline run-through.

Figure 5:
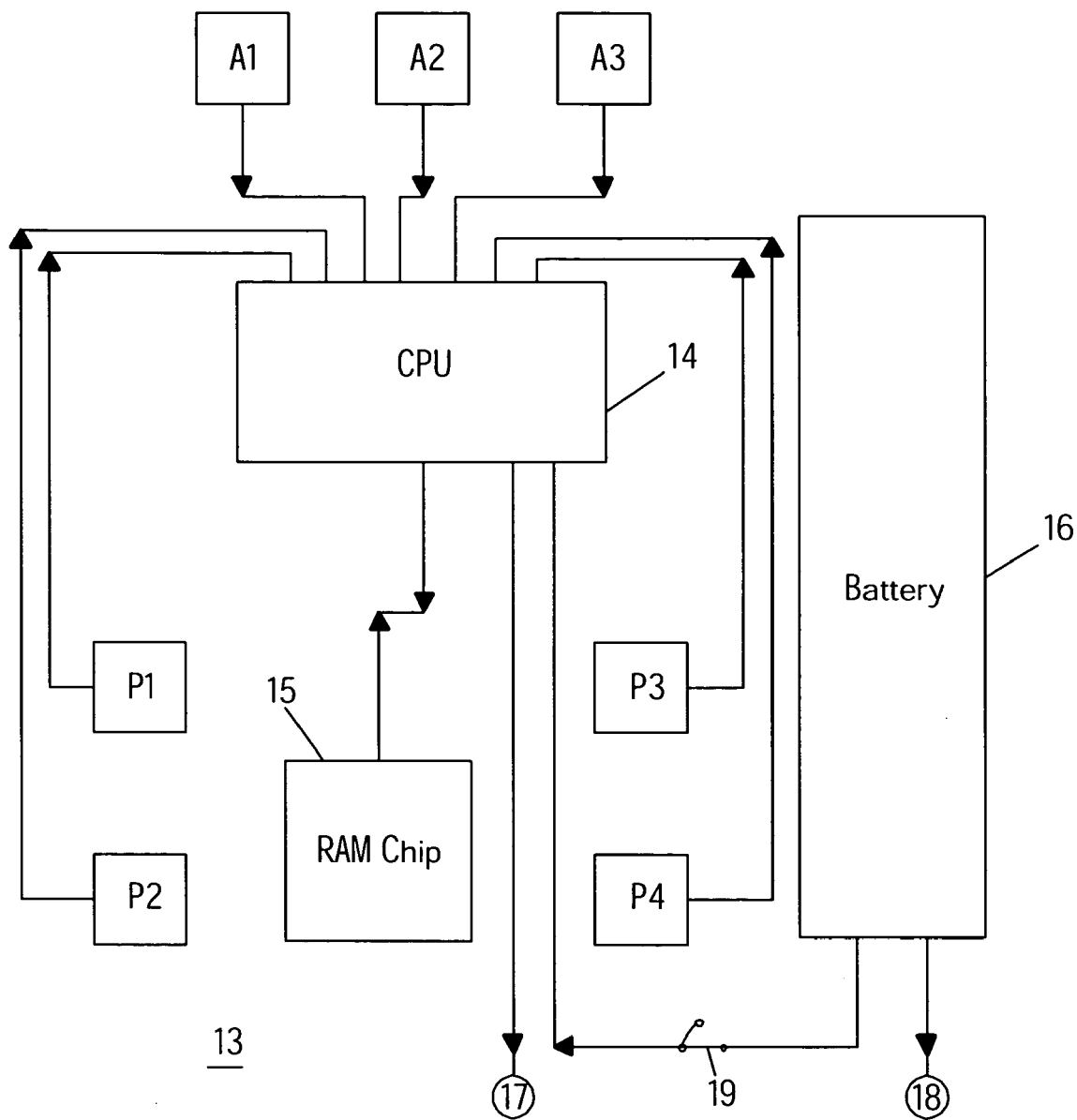
FIG. 5 is a block diagram schematic of the control instrumentation board with sensor components.

Referring to FIG. 5, the block diagram schematic as shown encompasses the control instrumentation board with sensor components 13 which may be electronically circuited technology components and materials. The sensor components, as diagrammed, refer to pressure sensors P1, P2, P3 and P4 accordingly for each orifice hole 10 from FIG. 3. The acceleration sensors A1, A2 and A3 represent accelerometers which shall be mounted along perpendicular axis' for measurement of acceleration differentials in three dimensional space. All sensors will be connected to a central processing unit 14 for recording of data corresponding to a predetermined time increment. The recorded data will be stored for retrieval via a random access memory chip 15 with sufficient storage space.

A rechargeable power supply battery 16 will be utilized for operation of all required board circuitry and sensors. Recorded data may be retrieved via a computer communications port 17. Power supply battery recharging will be accomplished through power adapter port 18. Device control instrumentation board with sensor components 13 may be powered on or off line via a power switch 19.

Accordingly, the foregoing description is intended to be construed as illustrative only, rather than limiting.

I claim:

1. A method for locating/coordinate mapping of a pipeline, comprising the steps of:
    a) providing a pipeline locator/coordinate mapping device comprising: a cylindrical housing having an outer surface, an inner surface, and an interior compartment; two outrigger cylindrical venturi nozzles affixed to said outer surface of said housing at spaced-apart, equidistant positions; a control instrumentation board positioned in said interior compartment of said housing; and at least two sensor components operatively connected to said control instrumentation board;
    b) powering online said device;
    c) placing said device into an interior of said pipeline;
    d) permitting said device to traverse through said pipeline and record data;
    e) retrieving said device from said pipeline;
    f) retrieving said recorded data from said device via a computer communications port on said device and into an external computer program; and
    g) powering offline said device.

2. The method according to claim 1, wherein said external computer program maps said pipeline by:
    ascertaining a datum of pressure and acceleration together with a specific time increment; and
    performing an analysis to derive a positional coordinate points in three dimensional space with respect to a displacement from a frame of reference; said positional coordinate points when drawn to scale, beginning from a pipeline reference origin, can be located/coordinate mapped in three dimensional space for creating an as-built plan of said pipeline.

3. The method according to claim 2, wherein said frame of reference is longitudinal and latitudinal coordinates along the Earth.

* * * * *